United States Patent [19]

Mabee

[11] Patent Number: 4,998,444
[45] Date of Patent: Mar. 12, 1991

[54] CONTROL SYSTEM FOR ELECTRIC SHIFT APPARATUS

[75] Inventor: Brian Mabee, Sterling Heights, Mich.

[73] Assignee: Automotive Products (USA) Inc., Auburn Hills, Mich.

[21] Appl. No.: 468,276

[22] Filed: Jan. 22, 1990

Related U.S. Application Data

[63] Continuation-in-part of Ser. No. 323,825, Mar. 19, 1989, and a continuation-in-part of Ser. No. 311,982, Feb. 16, 1989, Pat. No. 4,922,769, which is a continuation-in-part of Ser. No. 108,812, Oct. 15, 1987, Pat. No. 4,817,471.

[51] Int. Cl.$^5$ ............................................. B60K 20/10
[52] U.S. Cl. ....................................................... 74/335
[58] Field of Search ........................................... 74/335

[56] References Cited

U.S. PATENT DOCUMENTS

| | | | |
|---|---|---|---|
| 2,281,734 | 5/1942 | Whittaker | 171/97 |
| 2,634,622 | 4/1953 | Cripe | 74/335 |
| 3,277,734 | 10/1966 | Bernard | 74/335 |
| 3,573,582 | 4/1971 | Petrocelli | 318/305 |
| 3,937,105 | 2/1976 | Arai et al. | 74/846 |
| 3,942,614 | 3/1976 | Thompson | 192/4 A |
| 4,065,983 | 1/1978 | Mimura | 74/625 |
| 4,262,783 | 4/1981 | Scarrott et al. | 92/0.04 |
| 4,271,728 | 6/1981 | Wakamatsu | 74/866 |
| 4,275,618 | 6/1981 | Bale | 74/878 |
| 4,291,586 | 9/1981 | Buetemeister | 74/335 |
| 4,312,248 | 1/1982 | Sugimoto et al. | 74/861 |
| 4,324,153 | 4/1982 | Sugimoto et al. | 74/866 |
| 4,324,322 | 4/1982 | Sibeud | 192/0.032 |
| 4,339,962 | 7/1982 | Babel | 74/335 |
| 4,428,248 | 1/1984 | Broucksau et al. | 74/335 |
| 4,493,228 | 1/1985 | Vukovich et al. | 74/858 |
| 4,495,457 | 1/1985 | Stahl | 364/424.1 |
| 4,541,609 | 9/1985 | Smith | 251/129.03 |
| 4,558,612 | 12/1985 | Shimizu et al. | 74/844 |
| 4,567,969 | 2/1986 | Makita | 74/335 X |
| 4,570,765 | 2/1986 | Makita | 192/139 |
| 4,583,171 | 4/1986 | Hara et al. | 364/424 |
| 4,602,528 | 7/1986 | Bailey | 74/861 |
| 4,621,328 | 11/1986 | Arai et al. | 364/424.1 |
| 4,638,690 | 1/1987 | Hattori et al. | 74/866 |
| 4,664,217 | 5/1987 | Welch | 180/247 |
| 4,817,468 | 4/1989 | Leigh-Monstevens et al. | 74/335 |
| 4,817,471 | 4/1989 | Tury | 74/335 X |
| 4,821,590 | 4/1989 | Tury et al. | 74/335 |
| 4,821,607 | 4/1989 | Kawai | 74/866 |
| 4,823,643 | 4/1989 | Koshizawa | 74/866 |
| 4,825,831 | 5/1989 | Kawai | 123/360 |
| 4,825,993 | 5/1989 | Kurihara et al. | 192/0.092 |
| 4,841,793 | 6/1989 | Leigh-Monstevens et al. | 74/335 |
| 4,841,815 | 6/1989 | Takahashi | 74/866 |
| 4,843,901 | 7/1989 | Peterson et al. | 74/335 |
| 4,848,529 | 7/1989 | Kurihara et al. | 192/0.076 |
| 4,849,899 | 7/1989 | Cote et al. | 364/424.01 |
| 4,892,014 | 1/1990 | Morell et al. | 74/866 |
| 4,922,769 | 5/1990 | Tury | 74/335 |

FOREIGN PATENT DOCUMENTS

| | | |
|---|---|---|
| 0134646 | 3/1985 | European Pat. Off. . |
| 0310275 | 4/1989 | European Pat. Off. . |
| 0310387 | 4/1989 | European Pat. Off. . |
| 0316300 | 5/1989 | European Pat. Off. . |
| 0316301 | 5/1989 | European Pat. Off. . |
| 0316302 | 5/1989 | European Pat. Off. . |
| 0316303 | 5/1989 | European Pat. Off. . |
| 0328299 | 8/1989 | European Pat. Off. . |
| 0328362 | 8/1989 | European Pat. Off. . |
| 3827660 | 3/1989 | Fed. Rep. of Germany . |
| 54-49685 | 5/1981 | Japan . |
| 58-13764 | 8/1983 | Japan . |
| 60-40850 | 3/1985 | Japan . |
| 8903319 | 4/1989 | PCT Int'l Appl. . |
| 635278 | 3/1983 | Switzerland . |
| 1295060 | 11/1972 | United Kingdom . |
| 1455606 | 11/1986 | United Kingdom . |

OTHER PUBLICATIONS

SAE Paper 810949.
SAE Paper 831776.
SAE Paper 840448.
SAE Paper 850289.
SAE Paper 850782.
SAE Paper 860652.
SAE Paper 845094.
SAE Paper 861170.
SAE Paper 820392.
SAE Paper 820909.
SAE Paper 820920.

SAE Paper 830880.
SAE Paper 841307.
SAE Paper C247/85.
SAE Paper 852292.
SAE Paper 845094.
SAE Paper 861050.
Article Entitled "Allison Transmissions Electronic Control for On-Highway Applications".

*Primary Examiner*—Dirk Wright
*Attorney, Agent, or Firm*—Krass & Young

[57] ABSTRACT

A control system for an electric shift apparatus for a motor vehicle having an automatic transmission. The apparatus includes a power module adapted to be mounted on the housing of the transmission proximate the transmission mode select shaft and a control module adapted to be mounted in the passenger compartment. The power module includes an electric motor driving a speed reduction unit which in turn drives the transmission mode select shaft. The control module includes a logic module and a plurality of push button members corresponding respectively to the transmission shift positions. An encoder wheel provides a constant coded signal indicating the instantaneous position of the transmission mode select shaft. The logic module compares the present transmission position to the selected shift position and generates a signal to the motor to move the mode select shaft in a direction to achieve the selected shift position and stop the motor assembly when the encoder signal matches the selected shift position. The logic module provides a closed loop control system which, in the situation where the requested new position is only one position away from the present transmission position, moves the mode select shaft at a relatively slow speed and, in the situation where the requested position is more than one position away from the present transmission position, initially moves the mode select shaft at the relatively rapid speed and thereafter, as the mode select shaft reaches a position within one position of the requested position, moves the mode select shaft at the relatively slow speed to ensure accurate positioning of the mode select member without overshoot.

23 Claims, 6 Drawing Sheets

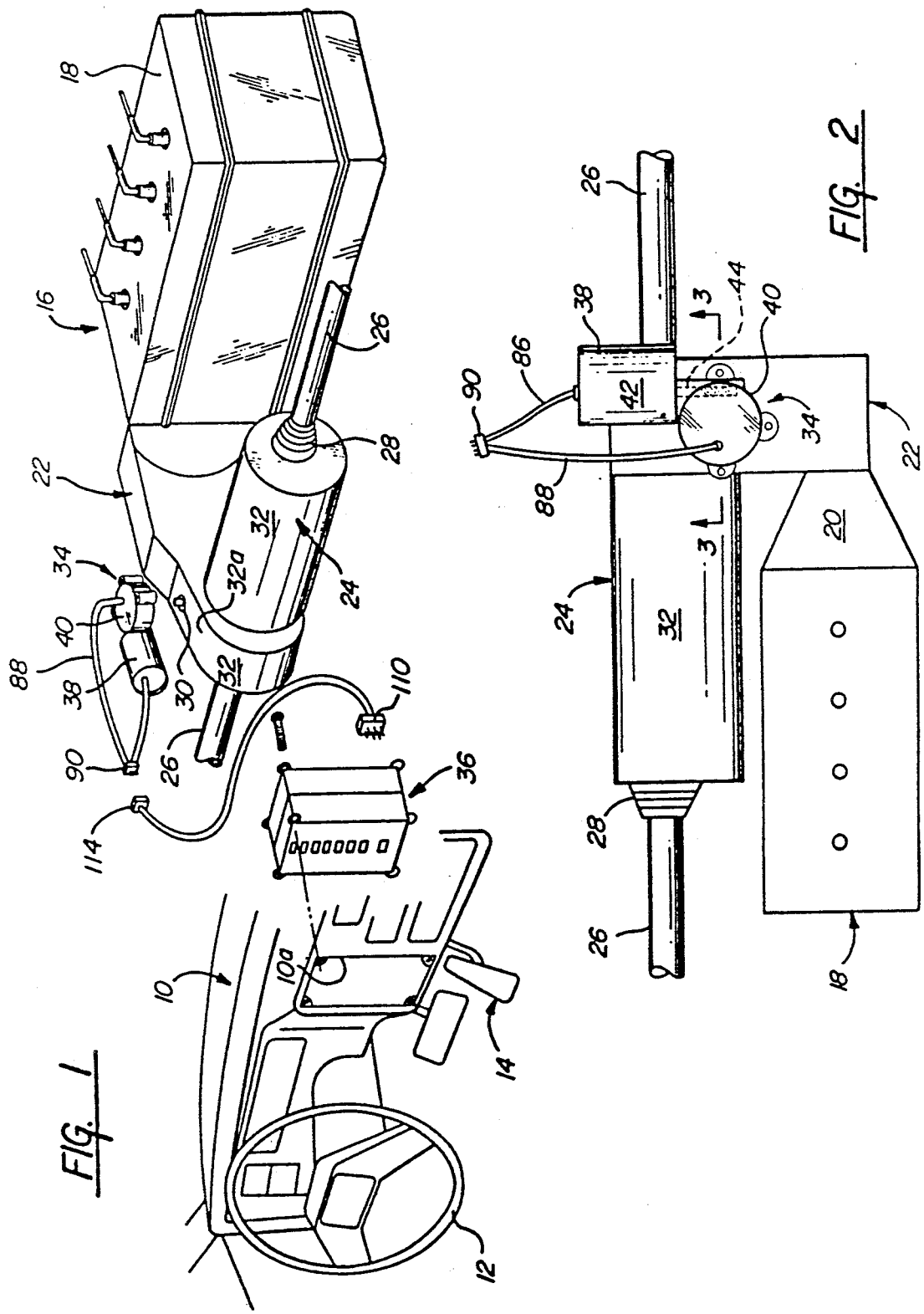

CONTROL SYSTEM FOR ELECTRIC SHIFT APPARATUS

REFERENCE TO RELATED APPLICATION

This application is a continuation-in-part of U.S. Pat. Application Ser. No. 323,825 filed on Mar. 15, 1989, and still pending, and Ser. No. 311,982 filed on Feb. 16, 1989, now U.S. Pat. No. 4,922,769, which latter application is a continuation-in-part of U.S. Pat. Application Ser. No. 108,812 filed on Oct. 15, 1987 and now U.S. Pat. No. 4,817,471.

BACKGROUND OF THE INVENTION

This invention relates generally to electric shift apparatus especially suited for use with a motor vehicle having an automatic transmission and more particularly to a control system for such an electric shift apparatus.

Motor vehicles since their inception have required some manner of gear change mechanism to satisfy the varying torque and speed requirements encountered during the typical duty cycle of a motor vehicle. For many years these gear change mechanisms were manual in the sense that they required an operator input from a shift lever or the like to effect each desired gear change ratio. More recently, so called "automatic" transmissions have become popular in which much of the shifting is done without operator input in response to speed and throttle opening parameters. These automatic transmissions typically include a mode select member on the transmission housing movable between a plurality of selected positions corresponding to a respective plurality of shift modes within the transmission. The mode select member is moved between its several shift positions via a cable or linkage mechanism extending from the mode select member to a suitable gear selector lever located in the passenger compartment of the vehicle.

More recently, control systems have been developed for motor vehicle automatic transmissions wherein electrical signals are generated by a suitable action on the part of the driver and transmitted electrically to some manner of power means arranged to move the mode select member. Examples of such control systems are shown for example in U.S. Pat. Nos. 4,790,204, 4,817,471, 4,841,793 and 4,843,901, all assigned to the assignee of the present application. Whereas the control systems of these patents have proven to be generally satisfactory, it is important that the control system operate in a manner to move the mode select member rapidly between its various positions and yet ensure that each position is arrived at cleanly, positively, and without overshoot.

SUMMARY OF THE INVENTION

This invention is directed to the provision of a control system for an electric shift apparatus for an automatic transmission of a motor vehicle in which the movement of the mode select member of the transmission is rapid and yet positive.

The invention control system is intended for use with a motor vehicle transmission of the type providing a plurality of shift mode positions and including a mode select member selectively movable to selectively provide the various shift mode positions.

The invention control system includes a control assembly adapted to be positioned in the passenger compartment of the vehicle and including operator accessible means for generating a plurality of operator request signals corresponding respectively to the transmission shift position, and means operative in response to operator generation of an operator request signal to move the mode select member at an initial speed that varies with the distance that the mode select member must move to achieve the shift position corresponding to the operator request signal. This arrangement allows the mode select member to be moved between its various shift position at varying speeds that are customized to suit peculiarities of the requested shift signal as compared to the present shift signal.

According to a further feature of the invention, the initial speed imparted to the mode select member is a predetermined higher speed when the distance that the mode select member must travel is a predetermined greater amount and a predetermined lower speed when the distance is a predetermined lesser amount. This specific arrangement allows the mode select member to be moved more rapidly when it must be moved through a greater distance and to be moved less rapidly when it must be moved through a lesser distance.

According to a further feature of the invention, the operative means is further operative, when the distance that the mode select member must be moved is a predetermined greater amount, to reduce the initial speed to a predetermined lesser speed after the mode select member has been moved through a distance that is a fraction of the predetermined greater amount. This arrangement allows the mode select member to be moved rapidly until it arrives at a position close to its final destination and then moved at a slower speed to ensure positive arrival at the final, requested position without overshoot.

According to a further feature of the invention, the transmission positions include a park position and the mode select member is always moved at the predetermined higher speed when being moved out of the transmission park position. This specific arrangement ensures that the required torque is available to release the parking sprag of the transmission when the transmission is being moved out of its park position.

In the disclosed embodiment of the invention, the mode select member is moved by an electric motor, the motor is part of a closed loop control circuit, and the circuit includes pulse width modulation means operative to reduce circuit voltage to a fraction of full circuit voltage to achieve the predetermined lower speed of the mode select member.

BRIEF SUMMARY OF THE DRAWINGS

FIG. 1 is a fragmentary perspective view of a front wheel drive motor vehicle embodying a control system according to the invention;

FIG. 2 is a fragmentary plan view of the front wheel drive assembly of the vehicle of FIG. 1;

DETAILED DESCRIPTION OF THE PREFERRED EMBODIMENT

Figure 3:
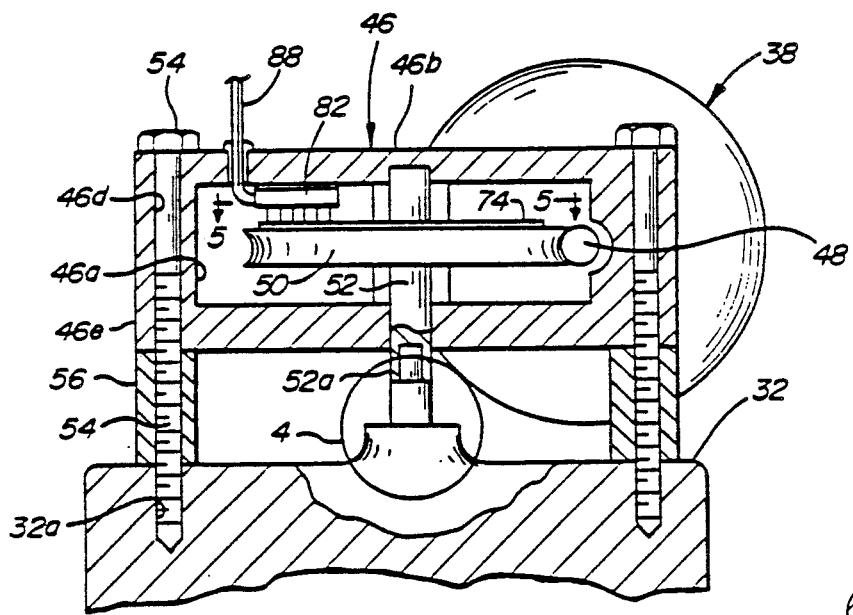
FIG. 3 is a view taken on line 3—3 of FIG. 2.
Figure 4:
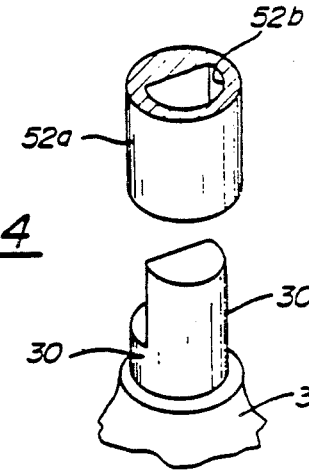
FIG. 4 is a fragmentary exploded perspective view of the structure within the circle 4 of FIG. 3.
Figure 5:
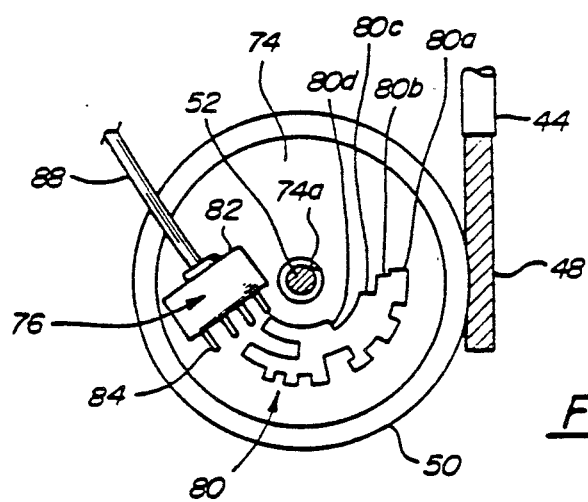
FIG. 5 is a view taken on line 5—5 of FIG. 3.
Figure 6:
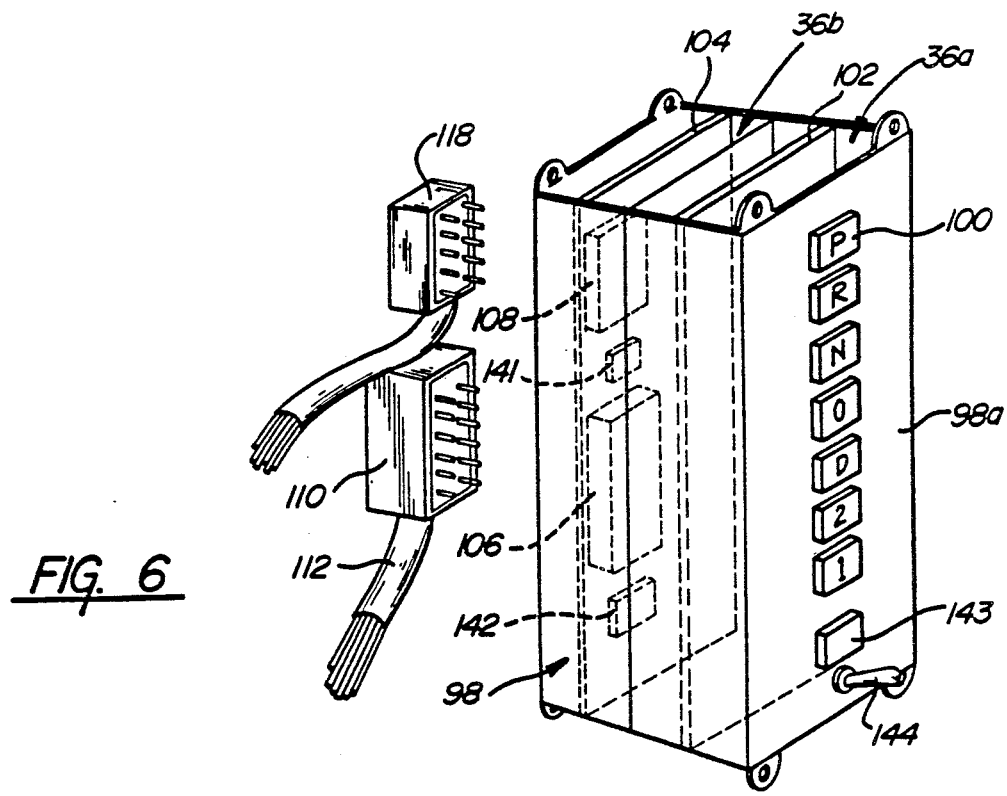
FIG. 6 is a fragmentary perspective view of a control module employed in the invention control system.

The invention control system is seen schematically in FIG. 1 in association with a motor vehicle of the front wheel drive type and including an instrument panel assembly 10 positioned within the passenger compartment of the motor vehicle; a steering wheel 12 associated with the instrument panel; an accelerator pedal assembly 14; and a front wheel drive assembly 16.

Front wheel drive assembly 16 includes an internal combustion engine 18 mounted transversely in the engine compartment of the vehicle, a torque converter 20 driven by engine 18, a gear drive assembly 22, an automatic transmission 24, and drive shaft 26 drivingly connected to the opposite ends of transmission 24 by U-joints 28. Transmission 24 includes a mode select shaft 30 having a free upper end positioned above the housing 32 of the transmission 24 and operable in known manner in response to rotation of the shaft to operate internal devices within the transmission to position the transmission in a plurality of transmission modes such as park, neutral, drive, etc.

The invention control system, broadly considered, comprises a power module 34 and a control module 36.

Power module 34 is adapted to be bolted to transmission housing 32 in proximity to mode select shaft 30 and control module 36 is adapted to be positioned in the instrument panel assembly 18 of the vehicle for convenient operator access.

Power module 34 is in the form of a motor assembly and includes a electric motor 38 and a speed reduction unit 40.

Motor 38 is a direct current motor having for example an output torque rating of 200 inch-pounds and includes a housing 42 and an output shaft 44.

Speed reduction unit 40 includes a housing 46 fixedly secured to motor housing 42 and defining an internal cavity 46a, a worm gear 48 formed as a coaxial extension of motor output shaft 44 and extending into cavity 46a, a worm wheel 50 positioned in cavity 46a and driven by worm wheel 48, and an output shaft 52 driven by worm wheel 50, journaled in housing walls 46b and 46c, and including a free lower end 52a positioned outside of and below housing wall 46. Shaft lower end 52a includes a D shaped opening 52b for driving, coupling receipt of the D shaped upper end portion 30a of mode select shaft 30.

Motor assembly 34 is mounted on the upper face of transmission housing 32 by a plurality of bolts 54 passing downwardly through bores 46d and lug portions 46e of reduction unit housing 46 and downwardly through spacers 56 for threaded receipt in tapped bores 32a in transmission housing 32. In assembled relation, reduction unit output shaft 52 is coaxially aligned with mode select shaft 30 and D opening 52b in reduction shaft lower end 52a telescopically receives D shaped upper end 30a of mode select shaft 30 so that actuation of motor 38 acts through worm shaft 38, worm wheel 50, and reduction unit output shaft 52 to rotate mode select shaft 30.

Power module 34 further includes an encoder assembly 72 operative to sense the instantaneous shift position of the transmission and generate an encoded signal representative of the sensed shift position.

Encoder assembly 72 includes an encoder wheel 74 and a pick-up device 76. Encoder wheel 74 may be formed for example of a suitable plastic material and is secured to a side face of worm wheel 50 within reduction unit housing chamber 46a. Encoder wheel 74 includes a central aperture 74a passing speed reduction output shaft 52 and further includes code indicia 80 provided on the exposed outer face of the wheel and arranged along four arcuate tracks 80a, 80b, 80c and 80d centered on the centerline of the encoder wheel.

Pick-up device 76 includes a plastic body member 82 mounting a plurality of flexible resilient contact fingers 84 for respective coaction with indicia tracks 80a, 80b, 80c and 80d. In addition to the four fingers 84 for respective engagement with the four indicia tracks, a fifth finger is provided to provide a ground for the system.

A lead 86 from motor 42 and a lead 88 from pickup device 76 are combined into a pin type plug 90.

Control module 36 is intended for ready installation in an opening 10a in instrument panel 10 by insertion of the module from the rear of the panel and fastening of the module within opening 10a by the use of several fasteners such as seen at 96. The module 36 includes a housing structure 98 of general boxlike configuration enclosing an operator access or push button submodule 36a and a logic submodule 36b.

Push button submodule 36a includes a plurality of push buttons 100 positioned in vertically spaced relation in the front face 98a of the module housing and corresponding to the available transmission shift modes. Specifically, buttons 100 include buttons corresponding to park, reverse, neutral, overdrive, drive, second and first shift positions for the transmission. Buttons 100 coact in known manner with a printed circuit board 102 to generate suitable electrical signals in response to respective depression of the buttons 100.

Logic submodule 36b includes an electronic printed circuit board 104 suitably electrically connected to printed circuit board 102 and suitably mounted a first plurality of connector terminals 106 and a second plurality of connector terminals 108. Connector terminals 106 coact with a pin type plug 110 at the end of a cable 112. Cable 112 includes a plug 114 at its remote end for plugging receipt of plug 90 so that plug 110 embodies the information from leads 86 and 88. Connector terminals 108 coact with a pin type plug 118. Plug 118 embodies the information from leads 120, 121, 122, 123, 124 and 125.

Lead 120 is associated with a switch 130 sensing the open or closed position of the driver's door of the vehicle; lead 121 is associated with a switch 132 sensing the presence or absence of a driver in the driver's seat of the vehicle; lead 122 senses the open or closed condition of the ignition switch 134 of the vehicle; leads 123 and 124 are connected to the negative and positive terminals of the vehicle battery 135 with a suitable fuse 136 in lead 123; and lead 125 is connected to a speed sensor 137 which provides information with respect to the instantaneous speed at which the vehicle is traveling.

The invention control system is delivered to the vehicle manufacturer in the form of power module 34 and control module 36. During assembly of the vehicle the power module 34 is mounted on the transmission housing 32 in coupling relation to mode select shaft 30 and the control module 36 is mounted in the instrument panel 10, whereafter plug 90 is plugged into plug 114 and plugs 110 and 118 are plugged into control module 36 to complete the assembly of the control system.

The mounting of power module 34 in the transmission housing is accomplished simply by positioning the lower end 52a of reduction shaft 52 over the upper end 30a of mode select shaft 30 and passing bolts 54 downwardly through bores 46d and spaces 56 for threaded engagement with tapped bores 32a in transmission housing 32.

Installation of control module 36 in instrument panel 10 is effected simply by moving the control module from the rear of the panel into the opening 10a and fastening the module in place by the use of fasteners 96 or the like. Following the plugging of plug 90 into plug 114 and the plugging of plugs 110 and 118 into connector terminals 106 and 108 the system is operational and ready for use.

Figure 7:
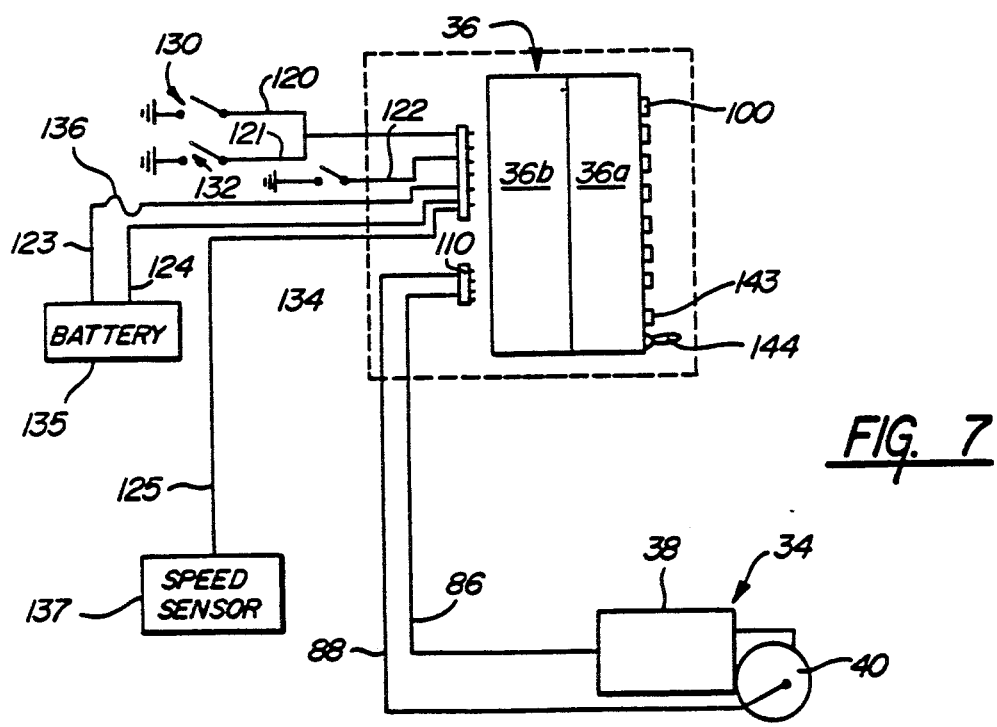
FIG. 7 is a circuit diagram of the invention control system.

In use various input signals such as described above and illustrated in FIG. 7 are supplied to a logic chip 141 which may be a programmable logic array or a gate array but is preferably in the form of a microprocessor. Logic chip 141 is configured to receive the described input signals and generate the necessary drive signals to motor 38 via a buffer 142 for providing the selection of the desired gear. Details of the manner in which logic 141 functions to generate the necessary drive signals to motor 38 in response to request signals from the control module are described in U.S. Pat. Nos. 4,790,204 and 4,817,471, both assigned to the assignee of the present application.

Logic 141 also embodies means to move the mode select shaft 30 at speeds that vary with the distance that the mode select shaft must move to achieve the shift position corresponding to the shift position requested by the depressed push button 100. More specifically, logic module 141 includes means to move the mode select shaft at a relatively low speed if a relatively small distance must be moved to achieve the requested position and to move the mode select shaft at an initially relatively high speed if a relatively large distance must be travelled to achieve the requested shift position and to move the mode select member at a relatively slow speed as the requested position is approached.

Figure 8:
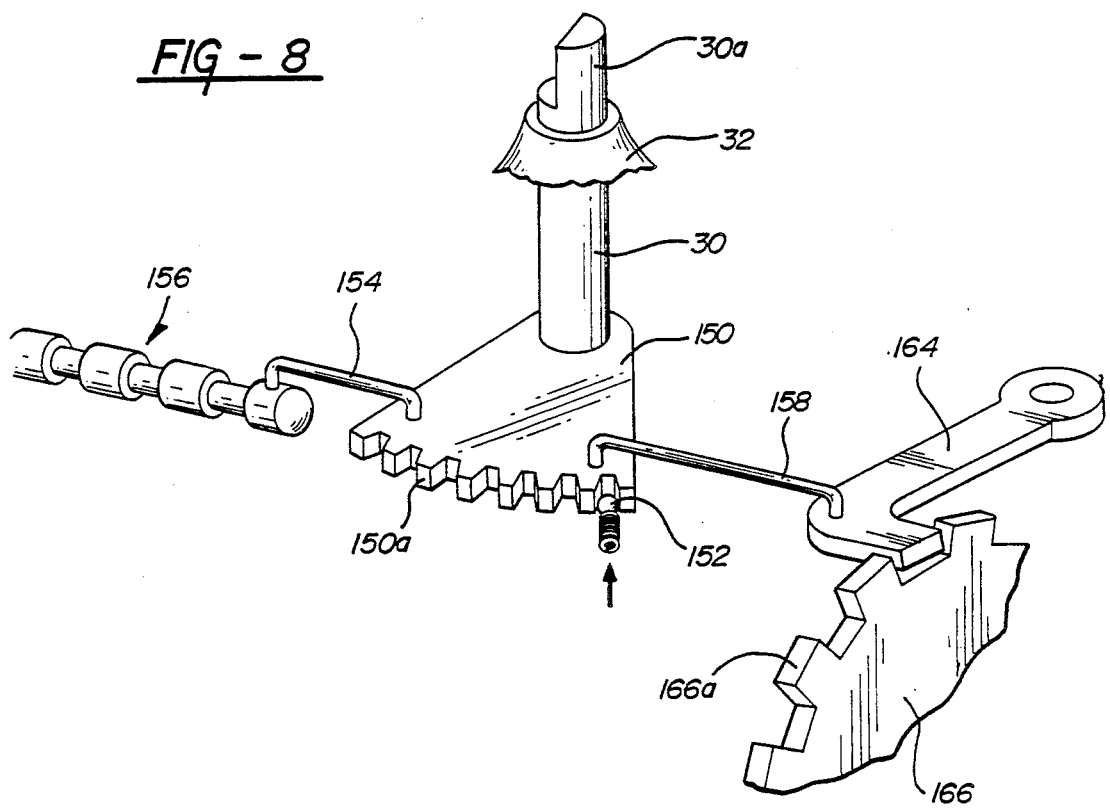
FIG. 8 is a fragmentary, perspective, schematic view of a portion of the invention control system.

The manner in which the movement of the mode select shaft 30 is converted to movement of the transmission to its various shift modes is shown schematically in FIG. 8 wherein a roostertail member 150 is secured to mode select shaft 30 within the transmission housing and defines a plurality of arcuately spaced teeth 150a for coaction in known manner with a suitable spring loaded follower detent 152 to positively detent the various positions of the mode select shaft; a rod 154 is secured at its one end to roostertail 150 and at its other end to a manual spool valve 156 of known form which is slidably mounted in the valve body of the transmission and operates in response to selected axial movement of the spool valve to shift the transmission between its various shift modes; and a rod 158 is secured at its one end to roostertail 150 and at its other end to a pivotally mounted detent or dog 164 which pivots into and out of locking engagement with the teeth 166a of a parking sprag wheel 166 in response to rotation of mode select shaft 30 to respectively position the transmission in its park position and move the transmission out of its park position. The manner in which the invention control system functions to vary the speed of rotation of mode select shaft 30 depending upon the distance that the shaft must move to achieve the requested shift mode position is illustrated in flow diagram form in FIG. 10. It will be understood that the logic required to carry out the flow diagram of FIG. 10 is incorporated into the logic of chip 141.

Figure 10A:
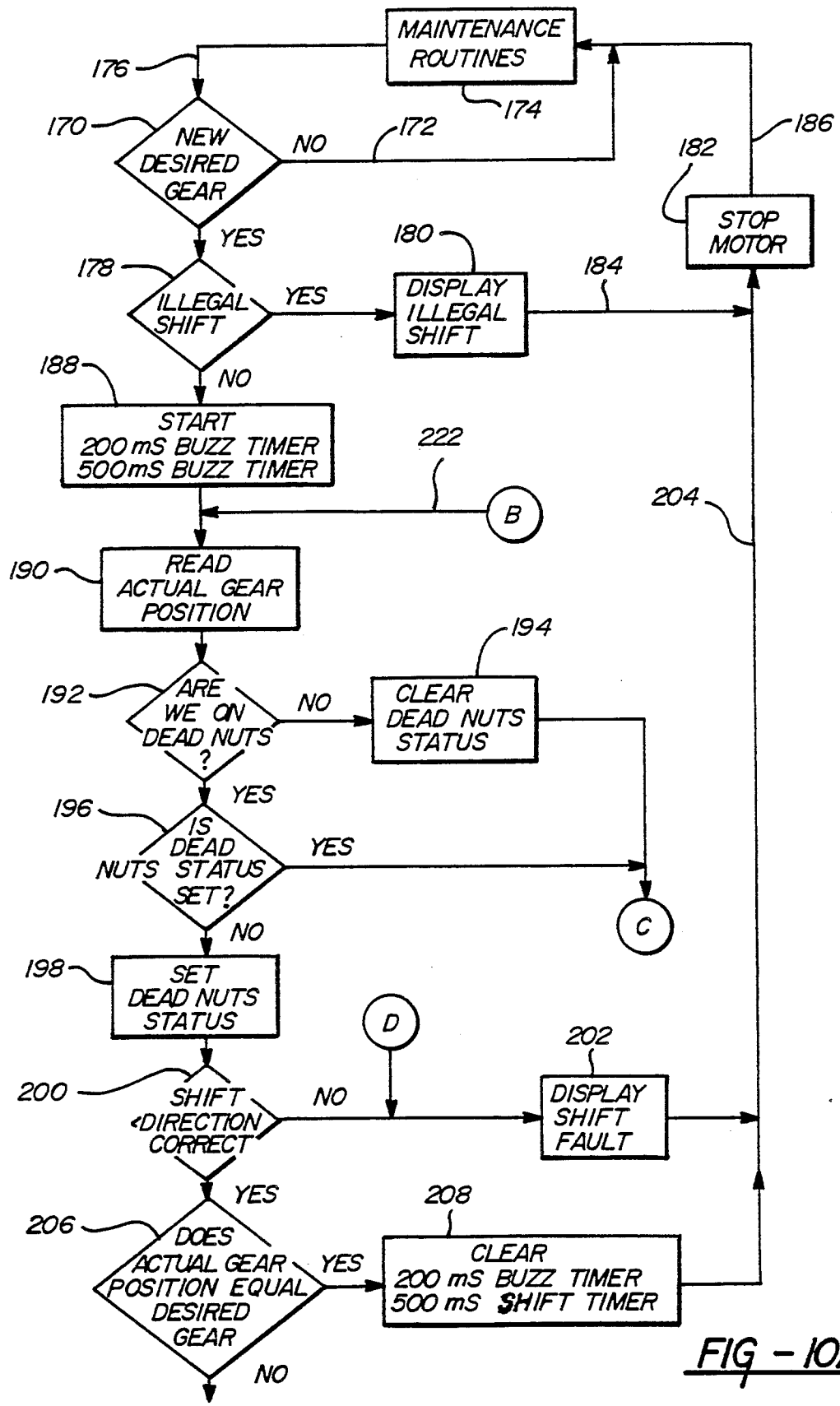
FIGS. 10A and 10B together comprise a flow chart illustrating a closed loop control circuit utilized in the invention control system.
Figure 10B:
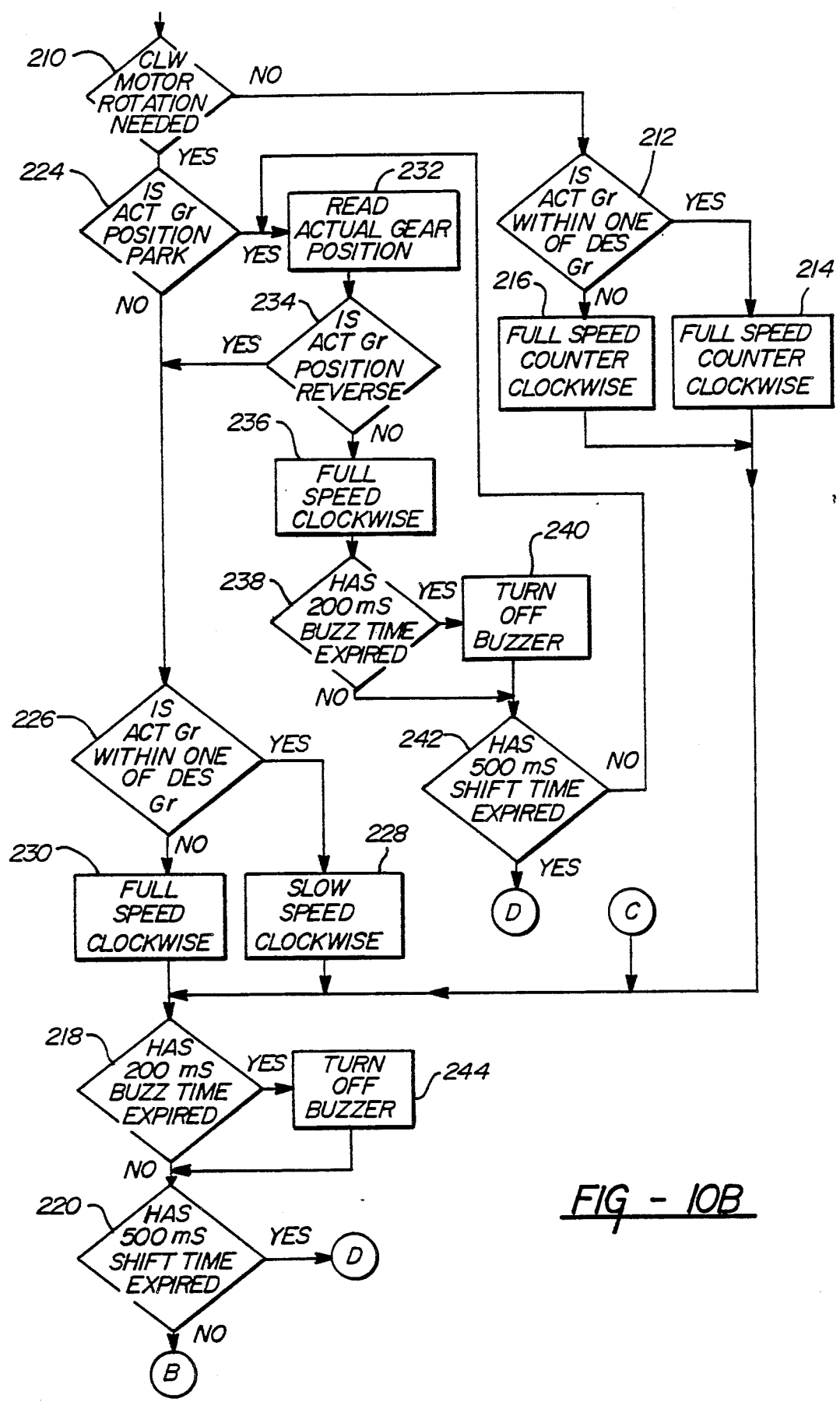

With reference to FIG. 10, and with the vehicle ignition in an On condition, the logic constantly checks at element 170 to see if a new desired gear has been requested, that is, a gear different from the present gear. If no new desired gear has been requested, the system goes through a maintenance routine at element 174 in a closed loop consisting of elements 170, 172, 174 and 176 and continues to cycle through this loop until a new desired gear is requested whereupon a Yes signal is transmitted to element 178 which checks to see if the shift is a legal shift (for example, whether the vehicle is traveling within the speed range in which the requested shift is permitted). If the requested shift is not legal, the illegal shift is appropriately displayed (element 180) and the element 182 is appropriately signaled via lead 184 to stop the motor 38 and clear the shift, which signal is transmitted to element 174 via lead 186 so that the system resumes its closed loop cycling through elements 170, 172, 174 and 176 to perform the maintenance routines of the system.

If the requested shift signal is a proper or legal shift signal (for example, within the speed limit within which the requested shift is proper) a signal is transmitted to element 188 which starts two timers 188: a 200 millisecond buzz timer for a buzzer or chime to provide audio feedback that a new desired gear push button has been selected; and a 500 millisecond shift timer to limit the maximum length of time of a shift attempt. The length of the buzz timer is selected to provide the desired duration of audio feedback. The length of the shift timer should be selected as slightly longer than the longest expected duration required for a normal shift. As will seen below, the shift is aborted if the actual gear differs from the desired gear for more than this 500 millisecond interval.

The logic next reads the actual gear position signal at element 190 and checks at element 192 to see if the mode select shaft is presently in a "dead nuts" position (that is, is the follower detent 152 firmly positioned within the valley between adjacent teeth 150a of the roostertail corresponding to "dead nuts"). If the mode select shaft is not in a dead nuts position, an element 194 functions to clear a dead nuts status flag. Control is then passed to element 218 described below. If the element 192 detects that the mode select shaft is in a dead nuts position, it appropriately signals element 196 which functions to ascertain whether the dead nuts status flag is set. If element 196 ascertains that the dead nuts status flag is set, control passes to element 218 described below. If element 196 ascertains that the dead nuts status flag is not set, element 196 signals element 198 which functions to set the dead nuts status flag. This checking on the dead nuts position causes the system to change the state of the motor control only when the mode select shift is in the dead nuts position. This reduces the amount of testing required for shift control to the minimum necessary.

Element 200 now compares the new actual gear position signal with the previous actual gear position signal. This comparison is made to determine if the mode select shaft is moving in the proper direction to reach the desired gear. This fault could take place, for example, if the leads to motor 38 were reversed on installation. Element 200 would detect the improper rotation direction after only a small motor rotation. If this direction fault is detected, then element 202 displays a shift fault and signals element 182 via line 204. Element 182 serves to stop the motor as previously described.

If the shift direction is correct, element 206 functions to compare the actual gear position to the desired or requested gear position as determined by the depressed push button. If the actual gear position equals the desired gear position, an appropriate signal is transmitted to element 208 which clears the buzz and shift timers and signals element 182 via a lead 204 whereupon element 182 functions to return the system to the closed maintenance loop 170, 172, 174, 176.

If the actual position is different from the desired gear position, element 206 functions to signal element 210 which determines whether clockwise motor rotation is required to achieve the desired gear position. If clockwise motor rotation is not required (that is, counterclockwise rotation is required) an appropriate signal is transmitted to element 212 which checks to ascertain whether the desired gear is different from the actual gear by one position. If the desired gear is different from the actual gear by one position, the element 214 is signaled to provide a signal to the motor 38 which is pulse width modulated and which thereby has the effect of driving the motor in a counterclockwise direction, at a reduced average power and a reduced speed, towards the desired gear position.

Element 214 also communicates with element 218 which, assuming that the 200 millisecond buzz time allocated for indicating a new desired gear is not over, signals element 220 which, assuming that the 500 millisecond one shot time alloted to complete the shift is not over, signals element 190 via lead 222 to begin a new cycle to elements 190, 192, 196, 198, 200 and 206 Assuming the mode select shaft has arrived at a new dead nuts position, element 206 again checks to see if the actual position equals the desired or requested gear position (that is, has the mode select member completed its move to the requested gear position).

If the modes select member has not yet achieved the requested gear position, the cycle continues through elements 210, 212, 214, 218, 220, 222, 190, 196, 198, 200 and again back to 206 where again a check is made to see if the mode select shaft has reached the requested gear position. The cycling continues until the mode select shaft has in fact reached the requested gear position whereupon, the next time that the cycle reaches element 206, a signal is sent to element 208, rather than to element 210, to clear the buzz and shift timers and signal to element 182 to stop the shift and clear the desired position, whereupon the system is returned through lead 186 to its maintenance loop 170, 172, 174, 176.

Returning now to the situation where element 210 has determined that counterclockwise motor rotation is required to achieve the requested gear position and this fact is transmitted to element 212, and assuming now that element 212 ascertains that the desired gear is different from the actual gear by more than one position, element 212 now signals element 216 which functions to provide a full speed (that is, a non pulse width modulated) power signal to the motor for counterclockwise rotation to provide the relatively high initial rotational speed for the mode select shaft as it begins its movement toward a requested gear position that is more than one position away from the actual gear position.

Element 216 also completes a circuit to element 218 and thence, assuming that the 200 millisecond buzz time is not over, signals element 220 which, assuming that the 500 millisecond shift time is not over, signals element 190 via lead 222 to begin a new cycle through elements 192, 196, 198, 200, 206, 210 and 212. As the looping signal again arrives at element 212, element 212 again checks to see if the desired gear position is different from the actual gear position by one position and, if the answer continues to be "No," element 212 continues to signal element 216 which in turn continues to provide a full speed, full power signal to the motor for rotation in the counterclockwise direction. This cycling through the system continues until such time as the element 212 detects that the actual gear position, as tracked repetitively by the element 212, is within one position of the desired gear position whereupon, upon the next arrival of the cycling signal at the element 212, the element 212 signals the element 214 to provide a pulse width modulated voltage to the motor for counterclockwise rotation at a reduced speed and, as previously described, the system continues to cycle through elements 218, 220, 190, 196, 198 and 200 until element 206 indicates that the actual position equals the desired gear position, whereupon element 206 provides a signal through elements 208 and 182 to stop the shift and, via lead 186, return the system to its maintenance cycling loop 170, 172, 174, 176.

Returning now to the situation where element 206 determines that clockwise motor rotation is required, an appropriate signal is provided to element 224 which determines whether or not the actual transmission position is the park position. If the element 224 determines that the mode select shaft is not in the park position, it signals element 226 which determines whether the desired gear position is different from the actual gear position by one position. If this answer is Yes, element 226 signals element 228 to provide a reduced power pulse width modulated signal to rotate the motor at a reduced speed in a clockwise direction. This signal is continued, in the manner previously described, through elements 218, 220, 190, 192, 196, 198, 200 and back to element 206 which again checks to see if the actual position is equal to the desired gear position. If the answer continues to be No, then the cycle is continued through elements 210, 224, 226, 228, 220, 190, 192, 196, 198, 200 and again back to element 206. This cycling continues until element 206 ascertains that the mode select shaft has reached its requested position, whereupon the next looping signal arriving at 206 is diverted through elements 208 and 182 to stop the shift and, via lead 186, to reinstate the maintenance looping cycle through elements 170, 172, 174, 176.

Returning now to element 226, if element 226 ascertains that the desired gear is different from the actual gear by more than one position, it appropriately signals element 230 which provides a full speed, full power signal to motor 38 to provide an initial high speed rotation of the mode select shaft as the shaft moves toward a requested, relatively distant position. Element 230 also continues the looping signal through elements 218, 220, 190, 192, 196, 198, 200, 206, and 210 and element 226 continues to provide a full speed, full power signal to the motor until element 226 senses that the mode select shaft has arrived at a position that is only one position away from the requested position whereupon, upon the next arrival of the looping signal, element 226 functions to signal element 228 to provide a pulse width modulated reduced voltage signal to the motor, which signal is continued until element 206 senses that the actual position of the mode select shaft equals the requested gear position, whereupon the looping signal arriving at element 206 is diverted to elements 208 and 182 to stop the shift and thereafter, via lead 186 to reinstate the maintenance routine through loop 170, 172, 174, and 176.

Returning now to the situation where element 224 senses that the actual position is equal to park, the looping signal arriving at element 224 is diverted to element 232 which functions to read the actual position of the mode select shaft to provide a signal to element 234 which checks to see if the actual gear position is within the range of positions corresponding to the reverse gear. If the actual position is not within the range of reverse, a signal is transmitted to element 236 which functions to drive the motor full speed in a clockwise direction in order to meet pull-out-of-park motor torque requirements to release dog 164 from sprag wheel 166. This situation is the exception to the general rule that the speed and direction of motor drive is determined only upon passing a dead nuts position.

Once motor 38 is provided with a full speed, full power, clockwise signal by element 236, a signal is passed to element 238, which checks to determine if the 200 millisecond buzz time has expired. If this buzz time has expired, then element 240 turns off the buzzer. In either event, a signal is sent to element 242 which checks to determine if the 500 millisecond shift time has expired. If this shift time has expired, then element 242 signals element 202 to display a shift fault and then element 202 signals element 182 via line 204 to stop the shift. The logic then returns to the closed maintenance loop 170, 172, 174 and 176. The test for the expiration of the buzz and shift times are made at this point because the logic does not pass through elements 218 and 220 during the pull-out-of-park interval.

Assuming that the 500 millisecond shift time has not expired, element 242 signals element 232 which reads the actual gear position. The logic remains in this loop including elements 232, 234, 236, 238 and 242 until element 234 determines that the actual gear position is within the range of reverse.

Figure 9:
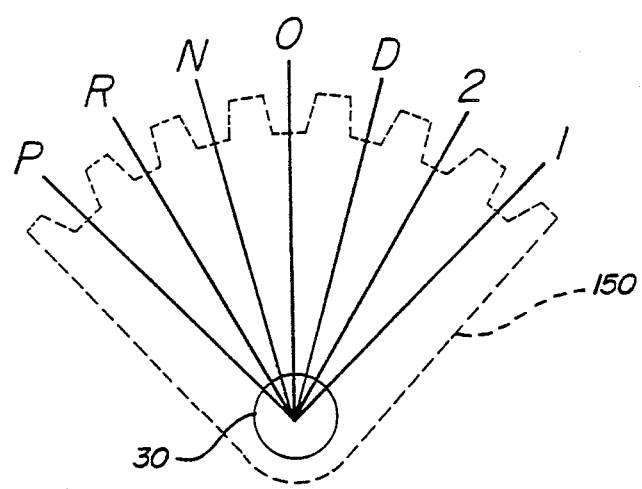
FIG. 9 is a diagrammatic view illustrating the various positions of the mode select shaft of the present invention.

With this arrangement, the motor is provided with a full speed, full power, clockwise signal even if the requested gear position is reverse which, as seen in FIG. 9 showing the classical arrangement of the shift mode positions, is only one position away from park. As previously indicated, this ensures that the motor will be given a full speed, full power signal whenever the actual gear is park to ensure that the pull-out-of-park torque requirements are satisfied to ensure positive and effective disengagement of dog 164 from the sprag wheel 166.

In the specific case where the requested position is R with the transmission in park, the full speed signal to the motor continues until the cycling signal arrives at element 234 and element 234 senses that the mode selector shaft has arrived at a position within the range of reverse, at which time element 234 functions to provide a signal to element 226. In such a case, element 226 determines that the desired gear is less than one gear away from the actual gear position and signals element 228 to drive the motor at a reduced pulse width modulated power until the mode select shaft, as sensed by element 192, arrives at a dead nuts position whereupon element 206 functions to signal element 208 and thereby element 182 to stop the shift and place the system back in the maintenance routine cycle.

If, with the transmission in Park, a shift other than Reverse is requested, element 236 functions as described to provide initially a full speed, full power signal to the motor which continues until element 234 senses that the actual position is within the range of reverse whereupon element 226 functions to determine whether the desired gear is different from the actual gear by one position and appropriately signals either element 230 to continue the full speed, full power rotation of the motor or signals element 228, upon the arrival of the mode select shaft within one position of the requested position, to provide pulse width modulated voltage to the motor to move the mode select shaft through the final position to the requested position, whereupon element 206 again functions to signal elements 208 and 182 to stop the shift and allow the system to resume its maintenance routine cycle.

Once the 200 millisecond buzz time has expired, element 218 signals element 244 to turn off the buzzer. As previously indicated, this buzzer is employed to give the driver audio feedback that the system has received a new desired gear signal.

Once the allocated 500 millisecond time for completing the requested shift has expired, and assuming that the requested shift has not been completed, element 220 functions to signal element 202 which functions to appropriately indicate a shift error and to signal element 182 to stop the shift and allow the system to resume the maintenance routine looping cycle.

It will be seen that the described control system functions to provide rapid shifting of the transmission between its various modes in response to requests by the operator and yet provides accurate positioning without overshoot as the mode select member arrives at the specific requested position. The described control system also ensures that, irrespective of the requested gear, full torque will be provided to the motor controlling the mode select shaft with the mode select shaft in its Park position to ensure that the pull-out-of-park torque requirements are met in every situation.

Whereas a preferred embodiment of the invention has been illustrated and described in detail, it will be apparent that various changes may be made in the disclosed embodiment without departing from the spirit or scope of the invention.

What is claimed is:

1. A control system for use with a motor vehicle transmission of the type providing a plurality of shift mode positions and including a mode select member selectively movable to selectively provide the various shift mode positions, said system comprising:
   a control assembly adapted to be positioned in the passenger compartment of the vehicle and including operator accessible means for generating a plurality of operator request signals corresponding respectively to each transmission shift position; and
   means operative in response to operator generation of an operator request signal to move said mode select member at an initial speed that varies with the distance that the mode select member must move to achieve the shift position corresponding to the operator request signal.
2. A control system according to claim 1 wherein:

said operative means includes power means drivingly connected to said mode select member, means generating a present transmission position signal, and comparator means receiving the present transmission signal and the operator request signal and operative to generate a command signal to said power means.

3. A control system according to claim 2 wherein: said power means comprises an electric motor.

4. A control system according to claim 1 wherein: said initial speed is a predetermined higher speed when said distance is a predetermined greater amount and a predetermined lower speed when said distance is a predetermined lesser amount.

5. A control system according to claim 4 wherein: said operative means are further operative, when said distance is said predetermined greater amount, to reduce said initial speed to a predetermined lesser speed after said mode select member has been moved through a distance that is a fraction of said predetermined greater amount.

6. A control system according to claim 5 wherein: said operative means is operative to reduce said initial speed to said predetermined lower speed after said mode select member has been moved through a distance that is a fraction of said predetermined greater amount.

7. A mode select member according to claim 5 wherein:
said operative means includes power means drivingly connected to said mode select member, means generating a present transmission position signal, and comparator means receiving the present transmission signal and the operator request signal and operative to provide power to said power means.

8. A control system according to claim 7 wherein:
said power means comprises an electric motor; and
a high power signal is delivered to said motor to achieve said predetermined higher speed and a lower power signal is delivered to said motor to achieve said predetermined lower speed and said predetermined lesser speed.

9. A control system according to claim 8 wherein:
said motor is part of a closed loop control circuit; and
said circuit includes pulse width modulation means operative to reduce circuit power to said lower power signal to achieve said predetermined lower speed and said predetermined lesser speed.

10. A control system according to claim 9 wherein:
said predetermined lesser speed equals said predetermined lower speed.

11. A control system for use with a motor vehicle transmission of the type providing a plurality of shift positions and including a mode select member selectively rotatable between a plurality of discrete angular positions to selectively provide the various shift mode positions, said system comprising:
a control assembly adapted to be positioned in the passenger compartment of the motor vehicle and including operator accessible means for generating a plurality of operator request signals corresponding respectively to each transmission shift position;
power means drivingly connected to said mode select member;
means generating a present transmission position signal; and
comparator means receiving an operator request signal and a present transmission position signal and operative to generate a command signal coded to rotate said mode select member in a clockwise or counterclockwise direction and further coded to rotate said mode select member at an initial angular speed that varies with the angular distance that the mode select member must be moved to achieve the requested shift position.

12. A control system according to claim 11 wherein:
said initial angular speed is a predetermined higher angular speed when said angular distance is a predetermined greater value and a predetermined lower angular speed when said angular distance is a predetermined lesser value.

13. A control system according to claim 12 wherein:
said predetermined greater value is equal to at least two shift positions of said mode select member.

14. A control system according to claim 13 wherein:
irrespective of the initial angular speed of said mode select member, said mode select member is rotated at said predetermined lower angular speed following movement of said mode select member to a position one position away from the requested position.

15. A control system according to claim 14 wherein:
said transmission positions include a park position; and
said mode select member is always rotated at said predetermined higher angular speed when being moved out of the transmission park position.

16. A control system according to claim 4 wherein:
said transmission positions include a park position; and
said mode select member is always moved at said predetermined higher speed when being moved out of the transmission park position.

17. In a motor vehicle transmission assembly including an automatic transmission having a mode select member selectably movable to selectively provide the various shift mode positions of the transmission, a control assembly adapted to be positioned in the passenger compartment of the vehicle and including operator accessible means for generating a plurality of operator request signals corresponding respectively to each transmission shift position, a power module drivingly connected to said mode select member, and a control logic system operative in response to operator generation of an operator request signal to move said mode select member to the position corresponding to the operator request signal, the improvement wherein:
said control system is operative to move said mode select member in response to operator generation of an operator request signal at an initial speed that varies with the distance that the mode select member must move to achieve the shift position corresponding to the operator request signal.

18. A motor vehicle transmission assembly according to claim 17 wherein:
said initial speed is a predetermined higher speed when said distance is a predetermined greater amount and a predetermined lower speed when said distance is a predetermined lesser amount.

19. A motor vehicle transmission assembly according to claim 18 wherein:
said control means are further operative, when said distance is said predetermined greater amount, to reduce said initial speed to a predetermined lesser speed after said mode select member has been moved through a distance that is a fraction of said predetermined greater amount.

20. A motor vehicle transmission assembly according to claim 19 wherein:
said control system is operative to reduce said initial speed to said predetermined lower speed after said mode select member has been moved through a distance that is a fraction of said predetermined greater amount.

21. A motor vehicle transmission assembly according to claim 20 wherein:
said power module includes an electric motor; and
a high power signal is delivered to said motor to achieve said predetermined higher speed and a lower power signal is delivered to said motor to achieve said predetermined lower speed and said predetermined lesser speed.

22. A motor vehicle transmission assembly according to claim 21 wherein
said motor is part of a closed loop control circuit; and
said circuit includes pulse width modulation means operative to reduce circuit power to said lower power signal to achieve said predetermined lower speed and said predetermined lesser speed.

23. A motor vehicle transmission assembly according to claim 22 wherein: said predetermined lesser speed equals said predetermined lower speed.

23. A motor vehicle transmission assembly according to claim 22 wherein:
said predetermined lesser speed equals said predetermined lower speed.

* * * * *